US009910818B2

United States Patent
O'Connor et al.

(10) Patent No.: US 9,910,818 B2
(45) Date of Patent: Mar. 6, 2018

(54) SERDES INTERFACE ARCHITECTURE FOR MULTI-PROCESSOR SYSTEMS

(71) Applicant: Lattice Semiconductor Corporation, Hillsboro, OR (US)

(72) Inventors: Stephen O'Connor, Lake Oswego, OR (US); Shyam Chandra, Beaverton, OR (US); Robert Bartel, Beaverton, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 953 days.

(21) Appl. No.: 14/043,920

(22) Filed: Oct. 2, 2013

(65) Prior Publication Data
US 2015/0095534 A1   Apr. 2, 2015

(51) Int. Cl.
*G06F 13/42*   (2006.01)
(52) U.S. Cl.
CPC .............................. *G06F 13/4295* (2013.01)
(58) Field of Classification Search
CPC ........ G06F 13/385; G06F 13/38; G06F 13/36; G06F 13/4004; G06F 13/00; G06F 13/20
USPC ................. 710/106, 305–306, 100
See application file for complete search history.

(56) References Cited

U.S. PATENT DOCUMENTS

| 5,400,340 | A | * | 3/1995 | Hillman | H04J 3/0632 370/419 |
| 5,548,767 | A | | 8/1996 | Langendorf | |
| 5,764,966 | A | * | 6/1998 | Mote, Jr. | G06F 13/4059 710/310 |
| 5,887,134 | A | * | 3/1999 | Ebrahim | G06F 15/17331 709/200 |
| 6,006,340 | A | | 12/1999 | O'Connell | |
| 6,480,920 | B1 | | 11/2002 | Akiyama | |
| 6,757,763 | B1 | | 6/2004 | Preiss et al. | |
| 2009/0138634 | A1 | | 5/2009 | Katayama et al. | |

* cited by examiner

*Primary Examiner* — Tim T Vo
*Assistant Examiner* — Kim T. Huynh
(74) *Attorney, Agent, or Firm* — Haynes and Boone, LLP

(57) ABSTRACT

A local device, such as a field-programmable gate array, has a local state machine and a local interface component for communicating with a remote device that implements a remote state machine. The local interface component receives a new set of incoming data from the remote device and determines whether the new set is good data or bad data. If good data, then the local interface component causes the new set of data to transmitted internally for use by the local state machine. If bad data, then the local interface component does not forward the new set of data to the local state machine, which instead continues to use a previously received set of good data. Although the clock rate of the local and remote state machines may differ from the frame rate of the local interface component, their operations are nevertheless synchronized.

20 Claims, 3 Drawing Sheets

100

SERDES INTERFACE ARCHITECTURE FOR MULTI-PROCESSOR SYSTEMS

BACKGROUND

Field

The present disclosure relates to electronics and, more specifically but not exclusively, to multi-processor systems that perform distributed logic functions, such as system-control functions.

Description of the Related Art

This section introduces aspects that may help facilitate a better understanding of the disclosure. Accordingly, the statements of this section are to be read in this light and are not to be understood as admissions about what is prior art or what is not prior art.

In some processor-based systems, a plurality of processors operate together to perform one or more different logic functions, such as system-control functions, in a distributed manner in which two or more processors communicate with one another to perform different parts of each system-control function. In order for such a multi-processor system to perform the distributed system-control functions properly, it is important for the processors to be able to deal with communication errors that may occur when bad data is received by one processor from another processor.

BRIEF DESCRIPTION OF THE DRAWINGS

Embodiments of the present disclosure are illustrated by way of example and are not limited by the accompanying figures, in which like references indicate similar or identical elements. Elements in the figures are illustrated for simplicity and clarity and have not necessarily been drawn to scale.

DETAILED DESCRIPTION

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
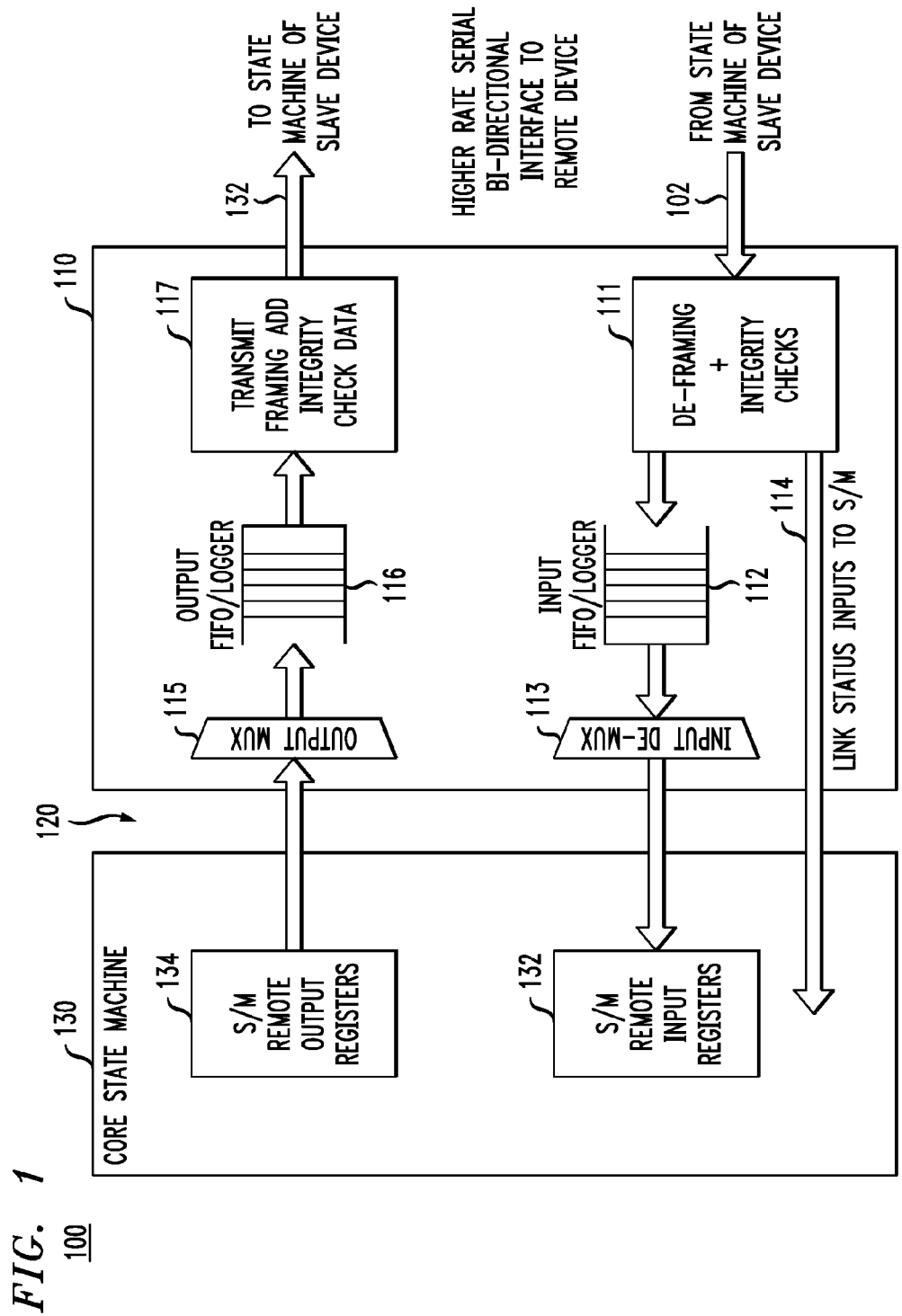
FIG. 1 shows a simplified functional block diagram of a portion of a master device according to one embodiment of the disclosure.

FIG. 1 shows a simplified functional block diagram of a portion of a processor (aka device) 100 according to one embodiment of the disclosure. According to one possible implementation, processor 100 is a programmable digital device, such as a field-programmable gate array (FPGA), that functions as a master device in a multi-processor system that includes at least one analog, slave device (not shown).

According to this exemplary implementation, each analog, slave device contains one or more analog sensors, such as temperature and/or voltage sensors, that generate corresponding analog measurements. Each slave device transmits measurement data to digital, master device 100, which processes that incoming measurement data. In addition, master device 100 transmits appropriate control data to each slave device to control the slave device's operations, where that control data may be, but does not have to be a function of the measurement data received by the master device from that slave device and/or from one or more other slave devices in the multi-processor system.

The elements shown in FIG. 1 represent the functional components associated with communications between master device 100 and one particular slave device. Although not shown in FIG. 1, an additional instance of those functional components exists in master device 100 for each additional, associated slave device in the multi-processor system.

In typical multi-processor systems, communication errors can occur in which the data received by one device from another device is corrupted with one or more bit errors or if there are disconnection and connection events (i.e., the data is bad). For many system-control functions, bad data should never be used. Some, relatively complex schemes for handling bad data involve error detection and error correction in which the receiving device detects and then corrects data errors to reconstruct the original set of good data that was sent by the transmitting device. Other schemes may involve error detection and data re-transmission in which the receiving device detects data errors and then requests re-transmission of the original set of good data by the transmitting device.

For some system-control functions, when a newly received set of data is determined to be bad, it is acceptable for the receiving device to continue to use a previously received set of good data until the next scheduled set of hopefully good data is received. Such schemes do not need to involve complicated error correction or even data re-transmission. According to certain embodiments of the present disclosure, when master device 100 of FIG. 1 receives a new set of data from a slave device, the master device determines whether the new set of data is good or bad, and, if it determines that the data is bad, the master device will continue to use a previously received set of good data from that slave device rather than the just received set of bad data.

As shown in FIG. 1, master device 100 has a SERDES (serializer/deserializer) input/output interface (I/F) component 110 and a core state machine 130 interconnected by an internal (i.e., intra-processor) communication interface 120. I/F component 110 has receive (RX) de-framer 111, which receives a relatively high-speed serial stream of incoming data 102 transmitted by the associated slave device. In addition to undoing whatever the frame structure the data was packed into by the slave device, RX de-framer 111 performs appropriate integrity checks, such as checksum computation and comparison, to determine whether each set (e.g., frame) of received data is good or bad. Integrity check data may alternatively or additionally include, without limitation, block codes, cyclic redundancy check (CRC) data, error-correction code (ECC) data, and/or fixed known patterns.

If RX de-framer 111 determines that the new set of received data is good, then the data is temporarily stored in input (RX) (e.g., relatively RAM-based) first-in, first-out (FIFO) buffer 112 before being de-multiplexed by input (RX) demux 113, which transmits the resulting multiple deserialized data streams over internal communication interface 120 for storage into input (RX) registers 132 within core state machine 130.

If RX de-framer 111 determines that the new set of received data is bad, then, depending on the particular implementation, the data might or might not be stored into RX FIFO buffer 112, but, in any case, the new set of bad data is not de-multiplexed and transmitted over internal communication interface 120 for storage into RX registers 132 within state machine 130. Rather, the previously received set of good data from the slave device is retained in RX registers 132 for processing by state machine 130.

In addition, RX de-framer 111 transmits link-status data to state machine 130 via out-of-band communication path 114 to inform the state machine whether or not the communication link with the corresponding slave device is good or bad. As described further below, the link status is set to "good" when the receive path from the slave device to I/F component 110 and the transmit path from the I/F component to the slave device are both good. Otherwise, if one or both of those paths is bad, then the link status is set to "bad." In an alternative implementation, the link-status data includes (at least) two sets of information: one for the status of the transmit path to the slave device and the other for the status of the receive path from the slave device.

State machine 130 processes whatever data is currently stored in RX registers 132, whether that data is a newly received set of good data or a previously received set of good data. Depending on the particular system-control function being implemented, the state machine's processing of the data stored in RX registers 132 might or might not affect the data stored in the state machine's output (TX) registers 134.

In any case, the outgoing data stored in TX registers 134 is transmitted in parallel data streams over internal communication interface 120 to I/F component 110, where output (TX) mux 115 serializes the outgoing data for temporary storage into output (TX) FIFO buffer 116. Transmit (TX) framer 117 generates appropriate integrity check data (e.g., checksum values) and packs them along with the outgoing data into an appropriate frame structure for transmission as high-speed outgoing serial data stream 132 to the slave device.

When a new set of good data is received by master device 100 from the associated remote slave device, as evidenced by a "good RX path" indication in link-status data 114, state machine 130 generates a positive, outgoing acknowledgment (i.e., TX ACK) message to be transmitted to the remote slave device by I/F component 110 as part of outgoing serial data stream 132. On the other hand, when a new set of bad data is received by master device 100 from the remote slave device, as evidenced by a "bad RX path" indication in link-status data 114, state machine 130 generates a negative, outgoing acknowledgment (i.e., TX NAK) message to be transmitted to the remote slave device by I/F component 110 as part of outgoing serial data stream 132.

In some embodiments of the disclosure, the remote slave device also transmits ACK and NAK messages to master device 100 to indicate whether the sets of data that the remote slave device has received from master device 100 are good or bad. These incoming RX ACK/NAK messages are received at RX de-framer 111 and provided to state machine 130 as part of link-status data 114.

Note that, because of the mux/demux functions performed by I/F component 110, the speed of the RX and TX serial paths 102 and 132 between master device 100 and the slave device is faster (i.e., higher clock rate) than that of each of the RX and TX parallel paths of internal communication interface 120 between I/F component 110 and core state machine 130. Furthermore, the clock frequency of core state machine 130 can be lower than the clock frequency of I/F component 110.

According to certain embodiments of the present disclosure, the timing of I/F component 110 is synchronized both (i) with the timing of core state machine 130 and (ii) with the timing of the state machine implemented in the remote device.

Figure 2:
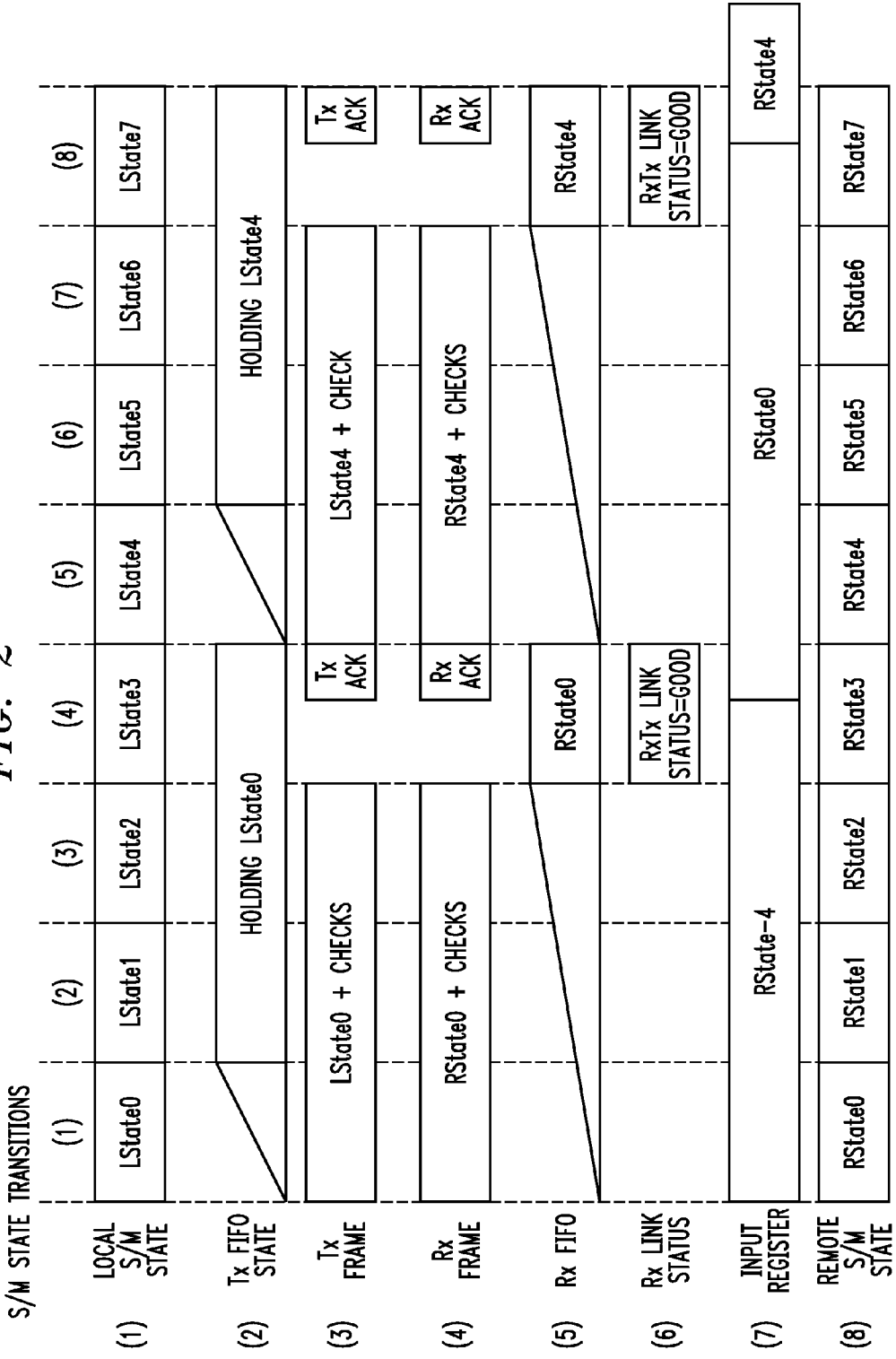
FIG. 2 shows a timing diagram for some of the processing implemented by the interface component and the core state machine of FIG. 1 when the master device sequentially receives two new sets of good data from an associated remote slave device, which also implements its own state machine.

FIG. 2 shows a timing diagram for some of the processing implemented by I/F component 110 and core state machine 130 of FIG. 1 when master device 100 sequentially receives two new sets of good data from the associated remote slave device, which also implements its own state machine. Depending on the particular implementation, the remote slave device might have an interface architecture similar to that of master device 100 with an I/F component analogous to IF component 110 and a state machine analogous to core state machine 130. In other implementations, the remote slave device may have any other suitable, different interface architecture that implements a state machine.

In the exemplary implementation of FIG. 2, core state machine 130 runs at a clock rate that is four times faster than the frame rate. In alternative implementations, other rates may apply, including a frame rate as fast as, but no faster than the S/M clock rate.

The timing diagram has eight different rows and eight different columns, where each column represents, from left to right, a different one of eight consecutive time periods corresponding to eight consecutive state machine (S/M) operating cycles, and where each vertical dashed line represents an S/M state transition from one S/M cycle to the next.

The first row of FIG. 2 represents the states, labeled LState0 to LState7, of core state machine 130 of the local master device 100 for the eight different time periods of FIG. 2. The second row represents the status of TX FIFO buffer 116 of master I/F component 110. The third row represents the transfer of outgoing data from the master I/F component to the remote slave node. The fourth row represents the receipt of incoming data by the master I/F component from the remote slave node. The fifth row represents the status of RX FIFO buffer 112. The sixth row indicates the status of the communications link between the local master device 100 and the remote slave device as reflected in link-status data 114. The seventh row identifies the data stored in RX registers 132 of state machine 130. The eighth and last row of FIG. 2 represents the states, labeled RState0 to RState7, of the state machine implemented by the remote slave device for the eight different time periods of FIG. 2.

Note that, as represented in FIG. 2, the state transitions of core state machine 130 occur substantially simultaneously with corresponding state transitions of the state machine implemented by the remote slave device. The frame length and transmission start times are aligned such that they are in lock step with the state transitions of the state machines. The slave state machine derives its clock alignment from the serial interface and the alignment of the frames received from the master state machine. The frame receptions complete between state transitions. Also the output register sampling and storing into TX FIFO buffer 116 before transmission happens between state transitions, as shown in row 2 of FIG. 2. This precludes partial updates of the control data at the receiving state machine. That is, when multiple outputs change, all changes are received in a single frame, not over multiple frames, which could otherwise lead to state transitions based on unintended transitional data combinations.

As represented in the second row of FIG. 2, during the first time period, a set of outgoing data, corresponding to the local S/M state LState0 and received from TX registers 134, is serialized by TX mux 115 and stored into TX FIFO buffer 116. The slanted line indicates the linear progress of serialization and storage of the LState0 data until completion by the end of the first time period and, in any case, before the next state transition. The flat line in columns 2-4 of the second row indicates that that same LState0 data is retained in TX FIFO buffer 116 through the end of the fourth time period.

During the fifth time period, another set of outgoing data, corresponding to local S/M state LState4, is serialized and stored into TX FIFO buffer 116 and then retained there until the end of the eighth time period.

As represented in the third row, the outgoing LState0 data along with the corresponding integrity check data generated by TX framer 117 are formatted into a frame and transmitted from I/F component 110 to the remote slave device. This data formatting and transmission starts at the beginning of the first time period and does not complete until the end of the third time period.

At the same time (i.e., during the first three time periods) and as represented in the fourth row, I/F component 110 receives, from the remote slave device, the data corresponding to the remote S/M state RState0 (which includes the corresponding integrity check data generated by the remote slave device) and stores that data into RX FIFO buffer 112. The slanted line in the first three columns of the fifth row represents the RState0 data progressively being stored into RX FIFO buffer 112 over the first three time periods. The flat line in the fourth column of the fifth row indicates that the RState0 data is retained in RX FIFO buffer 112 through the end of the fourth time period.

By the end of the third time period, RX de-framer 111 will have determined that the new set of received data is good data, and a "good-RX-data" indication would have been provided to core state machine 130 as part of link-status data 114, which, in turn, causes a TX ACK message to be transmitted during the fourth time period from I/F component 110 to the remote slave device, as indicated in the fourth column of the third row. Similarly, by the end of the third time period, the remote slave device will also have determined that the new set of data that it just received from the master device is also good data, and the slave device will then transmit an RX ACK message during the fourth time period to master device 100, as indicated in the fourth column of the fourth row. As a result, the link statuses of both the RX and TX paths 102 and 132 are good, as reflected in the fourth column of the sixth row.

As shown in the seventh row, during the first three time periods, the data stored in RX registers 132 for use by state machine 130 is the set of good data that was received from the remote slave device corresponding to the remote state RState-4 of the state machine in the remote slave device four time periods before the first time period shown in FIG. 2. After determining that the new set of received data is good by the end of the third time period of FIG. 2, I/F component 110 de-serializes and transmits that new set of good data to RX registers 132 during the fourth time period, thereby overwriting the old RState-4 data with the new RState0 data.

The processing of the first four time periods of FIG. 2 is repeated during the last four time periods of FIG. 2 for the local LState4 data and the remote RState4 data, resulting in (i) the local LState4 data being successfully transmitted to the remote slave device and (ii) the remote RState4 data being successfully received from the remote slave device and stored into RX registers 132 during the eighth time period for subsequent use by local state machine 130.

Figure 3:
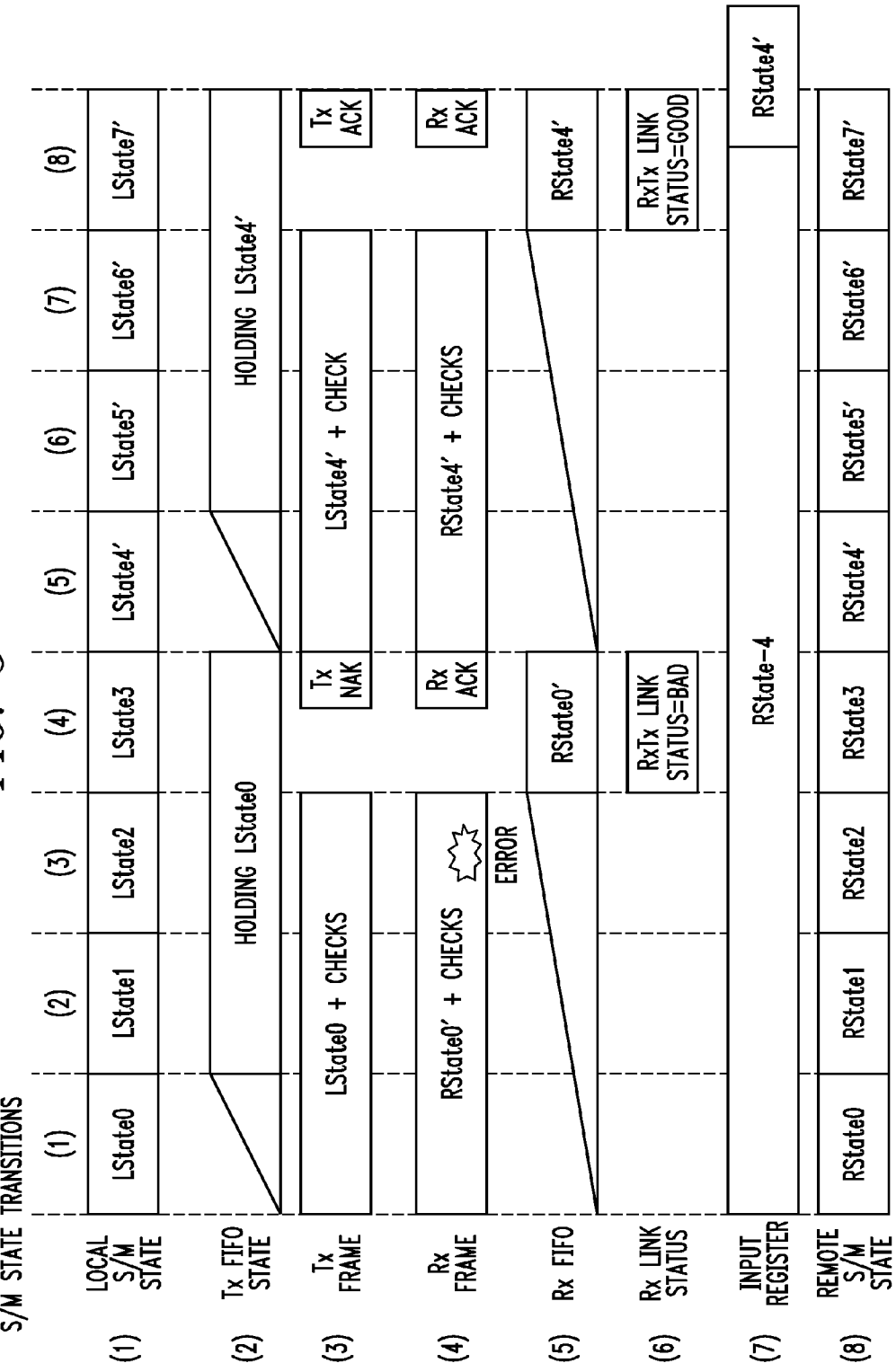
FIG. 3 shows a timing diagram for some of the processing implemented by the interface component and the core state machine of FIG. 1 when the master device sequentially receives a new set of bad data followed by a new set of good data from the associated remote slave device.

FIG. 3 shows a timing diagram for some of the processing implemented by I/F component 110 and core state machine 130 of FIG. 1 when master device 100 sequentially receives a new set of bad data followed by a new set of good data from the associated remote slave device. Note that, in the exemplary scenario of FIG. 3, both sets of outgoing data transmitted from the local master device are received by the remote slave device as good data. FIG. 3 is similar to FIG. 2, with analogous columns and rows representing analogous time periods and signal processing. The use of primes (') in FIG. 3 indicates that the data is different from the corresponding data in FIG. 2.

As indicated in the fourth row of FIG. 3, the data received at I/F component 110 from the remote slave device corresponding to the remote RState0' state of the slave's state machine is bad data as detected by de-framer 111 performing, for example, a checksum computation and a failed checksum comparison. In that case, the RX path is indicated as being bad in link-status data 114 (as represented in the fourth column of the sixth row of FIG. 3), a NAK message is transmitted from the master device to the slave device (as represented in the fourth column of the third row of FIG. 3), and the old RState-4 data is retained in RX registers 132 and continued to be used by local state machine 130 (as represented in the fourth through seventh columns of the seventh row of FIG. 3).

Because the old RState-4 data is continued to be used by the local state machine, the states LState4'-LState7' of local state machine 130 for the last four time periods of FIG. 3 may be different from the corresponding states LState4-LState7 for the same time periods of FIG. 2. Furthermore, when the remote slave device receives the NAK message during the fourth time period, it may adjust the operations of its state machine such that the states RState4'-RState7' of the remote state machine for the last four time periods of FIG. 3 may be different from the corresponding states RState4-RState7 for the same time periods of FIG. 2.

Since the second set of data received from the remote slave node corresponding to the RState4' state is good data, the RX path is indicated as being good in link-status data 114 (as represented in the eighth column of the sixth row of FIG. 3), an ACK message is transmitted from the master device to the slave device (as represented in the eighth column of the third row of FIG. 3), and the new RState4' data is written into RX registers 132 to be subsequently used by local state machine 130 (as represented in the eighth column of the seventh row of FIG. 3).

Although the disclosure was described in the context of the exemplary implementation of FIGS. 1-3, the disclosure is not so limited. In general:

- The state machine clock rate can be any multiple of the frame rate.
- The time given to integrity checks can be extended in any way such that the unchecked data is never presented to the data input.
- The system may opt to filter more than just error packets after an error is detected. For example, at link startup, a sequence of good packets may be required before responding to any inputs. This is particularly useful when a device remote to the state machine might make transitions from an unpowered state to a powered state, or vice versa.
- The system may be extended to count error statistics on the rate and react appropriately.

Embodiments of the disclosure may have one or more of the following characteristics:

- State machines (e.g., local state machine 130 and the slave device's remote state machine) running at one clock frequency communicate via a serialized interface (e.g., I/F component 110) running at a higher frequency.
- Frames on the serial interface represent a single coherent sample of the control inputs and outputs to the state machine. The frame rate may be the same as the state machine clock rate or a fixed integer fraction of the clock rate. The number of signals to transport and available clocks will determine that optimal rate.
- Frames for transmission are packed into a RAM/FIFO (e.g., TX FIFO buffer 116) so that a coherent sampling of outputs is made at one state transition, not over multiple state transitions.
- Frames received are first packed into a RAM/FIFO (e.g., RX FIFO buffer 112) while integrity checks are applied to that data frame. Only when the frame is fully received and known good, are signals passed to the receiving state machine input registers (e.g., RX registers 132), all updates completed before a single state transition, rather than over multiple state transitions.
- Detected errors on the link can be signaled to the state machines via sideband link status inputs (e.g., link-status data 114), while error data can be discarded and inputs to the state machine remain not updated.
- A state machine can selectively ignore input changes that may be due to bit errors until inputs arrive in error-free frames.
- The state machine can signal that the received frame (whether good or bad) should be stored or logged, without stalling the interface.
- The state machine can decide whether the transmitted frame should be stored or logged, without stalling the interface.
- The transmitted frames are aligned in lockstep with the core state machines and fields with the frame are also aligned to allow for the FIFO processes and integrity checking.

Embodiments of this disclosure are particularly suitable when it is more area efficient to hold received inputs at a prior value than to qualify with a global qualifier in the event of an error. This is useful in many situations, such as when inputs include single-bit representations of events or alarms from elsewhere in the system. The state machine can then propagate the inputs elsewhere directly as Mealy outputs, or via Moore outputs due to state transitions, but does so knowing that outputs or state will not change with error data.

Hardware implementation is particularly suited to field-programmable gate array (FPGA) architectures, where shallow FIFOs are numerous relative to flip-flops. In such architectures, the area cost of the received input register flop is much more costly per bit than a corresponding SRAM bit. This area benefit is a marked improvement over a shift register implementation when the input register is very sparsely populated. Moreover, logging of the full incoming data can be readily added to the FIFO structure.

Although the disclosure has been described in the context of master device 100, the interface architecture shown in FIG. 1 may also be used in one or more of the slave devices in that multi-processor system as well as in devices in multi-processor systems having device relationships other than master-slave, such as, for example, peer-to-peer.

Although the frame rate of the incoming data stream 102 is typically the same as the frame rate of the outgoing data stream 132, it some implementations, those frame rates may be different.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Embodiments of the invention may be implemented as (analog, digital, or a hybrid of both analog and digital) circuit based processes, including possible implementation as a single integrated circuit (such as an ASIC or an FPGA), a multi chip module, a single card, or a multi card circuit pack. As would be apparent to one skilled in the art, various functions of circuit elements may also be implemented as processing blocks in a software program. Such software may be employed in, for example, a digital signal processor, micro controller, general purpose computer, or other processor.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes, ports, or paths may be referred to by the same name and are interchangeable for purposes here. For example, in this disclosure, the label "114" is used to refer to the out-of-band communication path as well as to the link-status data transmitted over that path.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field-programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Digital information can be transmitted over virtually any channel. Transmission applications or media include, but are not limited to, coaxial cable, twisted pair conductors, optical fiber, radio frequency channels, wired or wireless local area networks, digital subscriber line technologies, wireless cellular, Ethernet over any medium such as copper or optical fiber, cable channels such as cable television, and Earth satellite communications.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non enabled embodiments and embodiments that correspond to non statutory subject matter are explicitly disclaimed even if they fall within the scope of the claims.

What is claimed is:

1. A local device comprising:
a local interface configured to transmit outgoing data having an outgoing frame rate to a remote device, receive first and second scheduled sets of incoming data having an incoming frame rate from the remote device, and perform a data integrity check to determine whether an error is present in the first and second scheduled sets of incoming data, wherein each scheduled set of incoming data comprises measurement data associated with a respective time period; and
a local state machine configured to generate the outgoing data and process the scheduled sets of incoming data, wherein:
the local interface runs synchronously with the local state machine and with a remote interface in the remote device;
when the local interface determines that no error is present in the first scheduled set of the incoming data, the local interface forwards the first scheduled set of the incoming data for use by the local state machine and the local state machine uses the first scheduled set of the incoming data in accordance with a first state;
when the local interface determines that no error is present in the second scheduled set of the incoming data, the local interface forwards the second scheduled set of the incoming data for use by the local state machine and the local state machine uses the second scheduled set of the incoming data in accordance with a second state; and
when the local interface determines that an error is present in the second scheduled set of the incoming data, the local interface does not forward the second scheduled set of the incoming data to the local state machine and the local state machine continues to use the first scheduled set of the incoming data in accordance with a third state.

2. The local device of claim 1, wherein:
a frame of incoming data is a first integer multiple X>1 of a duty cycle of the local state machine; and
a frame of outgoing data is a second integer multiple Y>1 of the duty cycle of the local state machine.

3. The local device of claim 2, wherein the first integer multiple X is equal to the second integer multiple Y.

4. The local device of claim 2, wherein:
the local interface captures the outgoing data in a single, first duty cycle of the local state machine;
the local interface transmits the outgoing data in an initial (X−1) duty cycles of the local state machine; and
the local interface verifies the second scheduled set of the incoming data in an Xth duty cycle of the local state machine.

5. The local device of claim 1, wherein:
the local interface comprises an input first-in-first-out (FIFO) data structure; and
the local state machine comprises input registers configured to store the first scheduled set of the incoming data, wherein:
the second scheduled set of the incoming data is stored in the input FIFO data structure;
when the local interface determines that no error is present in the second scheduled set of the incoming data, the local interface forwards the second scheduled set of the incoming data from the input FIFO data structure to the input registers of the local state machine for processing by the local state machine; and
when the local interface determines that an error is present in the second scheduled set of the incoming data, the local interface does not forward the second scheduled set of the incoming data to the local state machine, such that the local state machine continues to use the first scheduled set of the incoming data stored in the input registers of the local state machine.

6. The local device of claim 1, wherein, when the local interface determines that an error is present in the second scheduled set of the incoming data, the local interface transmits an out-of-band message to the local state machine indicating that an error is present in the second scheduled set of the incoming data.

7. The local device of claim 1, wherein, when the local interface determines that an error is present in the second scheduled set of the incoming data, the local interface transmits a negative acknowledgment (NAK) message to the remote device indicating that an error is present in the second scheduled set of the incoming data.

8. The local device of claim 1, wherein:
a frame of incoming data is a first integer multiple X>1 of a duty cycle of the local state machine;
a frame of outgoing data is the first integer multiple X of the duty cycle of the local state machine;
the local interface captures the outgoing data in a single, first duty cycle of the local state machine;
the local interface transmits the outgoing data in an initial (X−1) duty cycles of the local state machine;
the local interface verifies the second scheduled set of the incoming data in an Xth duty cycle of the local state machine;
the local interface comprises an input first-in-first-out (FIFO) data structure;
the local state machine comprises input registers configured to store the first scheduled set of the incoming data, wherein:
the second scheduled set of the incoming data is stored in the input FIFO data structure;
when the local interface determines that no error is present in the second scheduled set of the incoming data, the local interface forwards the second scheduled set of the incoming data from the input FIFO data structure to the input registers of the local state machine for processing by the local state machine; and
when the local interface determines that an error is present in the second scheduled set of the incoming data:
the local interface does not forward the second scheduled set of the incoming data to the local state machine, such that the local state machine continues to use the first scheduled set of the incoming data stored in the input registers of the local state machine;
the local interface transmits an out-of-band message to the local state machine indicating that an error is present in the second scheduled set of the incoming data; and
the local interface transmits a negative acknowledgment (NAK) message to the remote device indicating that an error is present in the second scheduled set of the incoming data.

9. The local device of claim 1, wherein the remote device implements a remote state machine to provide the incoming data, and state transitions of the local state machine occur substantially simultaneously with corresponding state transitions of the remote state machine.

10. A system comprising:
a local device including:
a local interface configured to transmit outgoing data, receive first and second scheduled sets of incoming data, and perform a data integrity check to determine whether an error is present in the first and second scheduled sets of incoming data, wherein each scheduled set of incoming data comprises measurement data associated with a respective time period; and
a local state machine configured to generate the outgoing data and process the scheduled sets of incoming data; and
a remote device configured to transmit the scheduled sets of incoming data to the local device and receive the outgoing data from the local device, the remote device including a remote state machine configured to generate the first and second scheduled sets of incoming data and process the outgoing data, with state transitions of the remote state machine occurring substantially simultaneously with corresponding state transitions of the local state machine, wherein:
when the local interface determines that no error is present in the first scheduled set of the incoming data, the local interface forwards the first scheduled set of the incoming data for use by the local state machine and the local state machine uses the first scheduled set of the incoming data in accordance with a first state;
when the local interface determines no error is present in the second scheduled set of the incoming data from the remote device, the local interface forwards the second scheduled set of the incoming data for use by the local state machine and the local state machine uses the second scheduled set of the incoming data in accordance with a second state; and
when the local interface determines that an error is present in the second scheduled set of the incoming data from the remote device, the local interface does not forward the second scheduled set of the incoming data to the local state machine and the local state machine continues to use the first scheduled set of the incoming data in accordance with a third state.

11. The system of claim 10, wherein:
a frame of incoming data from the remote device is a first integer multiple X>1 of a duty cycle of the local state machine; and
a frame of outgoing data to the remote device is a second integer multiple Y>1 of the duty cycle of the local state machine.

12. The system of claim 11, wherein the first integer multiple X is equal to the second integer multiple Y.

13. The system of claim 11, wherein:
the local interface captures the outgoing data in a single, first duty cycle of the local state machine;
the local interface transmits the outgoing data in an initial (X−1) duty cycles of the local state machine; and
the local interface verifies the second scheduled set of the incoming data in an Xth duty cycle of the local state machine.

14. The system of claim 10, wherein:
the local interface comprises an input first-in-first-out (FIFO) data structure; and
the local state machine comprises input registers configured to store the first scheduled set of the incoming data, wherein:
the second scheduled set of the incoming data is stored in the input FIFO data structure;
when the local interface determines that no error is present in the second scheduled set of the incoming data, the local interface forwards the second scheduled set of the incoming data from the input FIFO data structure to the input registers of the local state machine for processing by the local state machine; and
when the local interface determines that an error is present in the second scheduled set of the incoming data, the local interface does not forward the second scheduled set of the incoming data to the local state machine, such that the local state machine continues to use the first scheduled set of the incoming data stored in the input registers of the local state machine.

15. The system of claim 10, wherein, when the local interface determines that an error is present in the second scheduled set of the incoming data, the local interface transmits an out-of-band message to the local state machine indicating that an error is present in the second scheduled set of the incoming data.

16. The system of claim 10, wherein:
a frame of incoming data is a first integer multiple X>1 of a duty cycle of the local state machine;
a frame of outgoing data is the first integer multiple X of the duty cycle of the local state machine;
the local interface captures the outgoing data in a single, first duty cycle of the local state machine;
the local interface transmits the outgoing data in an initial (X−1) duty cycles of the local state machine;
the local interface verifies the second scheduled set of the incoming data in an Xth duty cycle of the local state machine;
the local interface comprises an input first-in-first-out (FIFO) data structure;
the local state machine comprises input registers configured to store the first scheduled set of the incoming data, wherein:
the second scheduled set of the incoming data is stored in the input FIFO data structure;
when the local interface determines that no error is present in the second scheduled set of the incoming data, the local interface forwards the second scheduled set of the incoming data from the input FIFO data structure to the input registers of the local state machine for processing by the local state machine; and
when the local interface determines that an error is present in the second scheduled set of the incoming data:
the local interface does not forward the second scheduled set of the incoming data to the local state machine, such that the local state machine continues to use the first scheduled set of the incoming data stored in the input registers of the local state machine;
the local interface transmits an out-of-band message to the local state machine indicating that an error is present in the second scheduled set of the incoming data; and
the local interface transmits a negative acknowledgment (NAK) message to the remote device indicating that an error is present in the second scheduled set of the incoming data.

17. The system of claim 10, wherein the remote device implements a remote state machine to provide the incoming data, and state transitions of the local state machine occur substantially simultaneously with corresponding state transitions of the remote state machine.

18. The local device of claim 1, wherein:
when the local interface determines that no error is present in the second scheduled set of the incoming data, the first scheduled set of the incoming data stored in input registers of the local state machine is overwritten with the second scheduled set of the incoming data; and
when the local interface determines that an error is present in the second scheduled set of the incoming data, the first scheduled set of the incoming data is retained in the input registers of the local state machine.

19. The local device of claim 1, wherein:
when the local interface determines that no error is present in the first scheduled set of the incoming data, the local state machine uses the first scheduled set of the incoming data to generate control signals associated with the remote device;
when the local interface determines that no error is present in the second scheduled set of the incoming data, the local state machine uses the second scheduled set of the incoming data to generate the control signals; and
when the local interface determines that an error is present in the second scheduled set of the incoming data, the local state machine continues to use the first scheduled set of the incoming data to generate the control signals.

20. The system of claim 10, wherein:
when the local interface determines that no error is present in the first scheduled set of the incoming data, the local state machine uses the first scheduled set of the incoming data to generate control signals associated with the remote device;
when the local interface determines that no error is present in the second scheduled set of the incoming data, the local state machine uses the second scheduled set of the incoming data to generate the control signals; and
when the local interface determines that an error is present in the second scheduled set of the incoming data, the local state machine continues to use the first scheduled set of the incoming data to generate the control signals.

* * * * *